US012703139B2

(12) United States Patent
Koide

(10) Patent No.: US 12,703,139 B2
(45) Date of Patent: Aug. 11, 2026

(54) IMPRINT APPARATUS AND ARTICLE MANUFACTURING METHOD

(71) Applicant: CANON KABUSHIKI KAISHA, Tokyo (JP)

(72) Inventor: Hiroyuki Koide, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 72 days.

(21) Appl. No.: 18/662,028

(22) Filed: May 13, 2024

(65) Prior Publication Data

US 2024/0391160 A1 Nov. 28, 2024

(30) Foreign Application Priority Data

May 23, 2023 (JP) ................................ 2023-084702

(51) Int. Cl.
*B29C 59/00* (2006.01)
*B29C 59/02* (2006.01)
*B29C 37/00* (2006.01)

(52) U.S. Cl.
CPC ............ *B29C 59/002* (2013.01); *B29C 59/02* (2013.01); *B29C 2037/90* (2013.01)

(58) Field of Classification Search
CPC .... B29C 59/002; B29C 59/02; B29C 2037/90
See application file for complete search history.

(56) References Cited

U.S. PATENT DOCUMENTS

2007/0035056 A1* 2/2007 Suehira ............... B29C 35/0888 264/494
2010/0072649 A1* 3/2010 Kawakami ............ G03F 7/0002 425/150
2013/0056905 A1* 3/2013 Hamaya ................ G03F 7/0002 264/293
2013/0093113 A1 4/2013 Hayashi et al.
2020/0183269 A1* 6/2020 Tavakkoli Kermani Ghariehali ............ G03F 7/0022

FOREIGN PATENT DOCUMENTS

| | | | |
|---|---|---|---|
| JP | 2013102132 | A | 5/2013 |
| JP | 2016058735 | A | 4/2016 |
| JP | 2020077797 | A | 5/2020 |
| JP | 2022136865 | A | 9/2022 |
| KR | 1020190067091 | A | 6/2019 |
| KR | 1020220110106 | A | 8/2022 |

* cited by examiner

*Primary Examiner* — JaMel M Nelson
*Assistant Examiner* — Erica Hartsell Funk
(74) *Attorney, Agent, or Firm* — ROSSI, KIMMS & McDOWELL LLP

(57) ABSTRACT

An imprint apparatus performs alignment between a substrate and a mold in a state in which the mold is in contact with an imprint material on the substrate, and then cures the imprint material by light irradiation. The apparatus includes a light irradiator configured to perform first light irradiation for partially curing the imprint material, and second light irradiation for deforming the substrate, and a controller configured to control the light irradiator. In the alignment, the controller performs switching between the first light irradiation and the second light irradiation based on a viscoelasticity of the imprint material or a deformation amount of the substrate.

9 Claims, 10 Drawing Sheets

7
130
133
132
110
111
120
20
125
126
112
134
121
122
123
124

F I G. 3
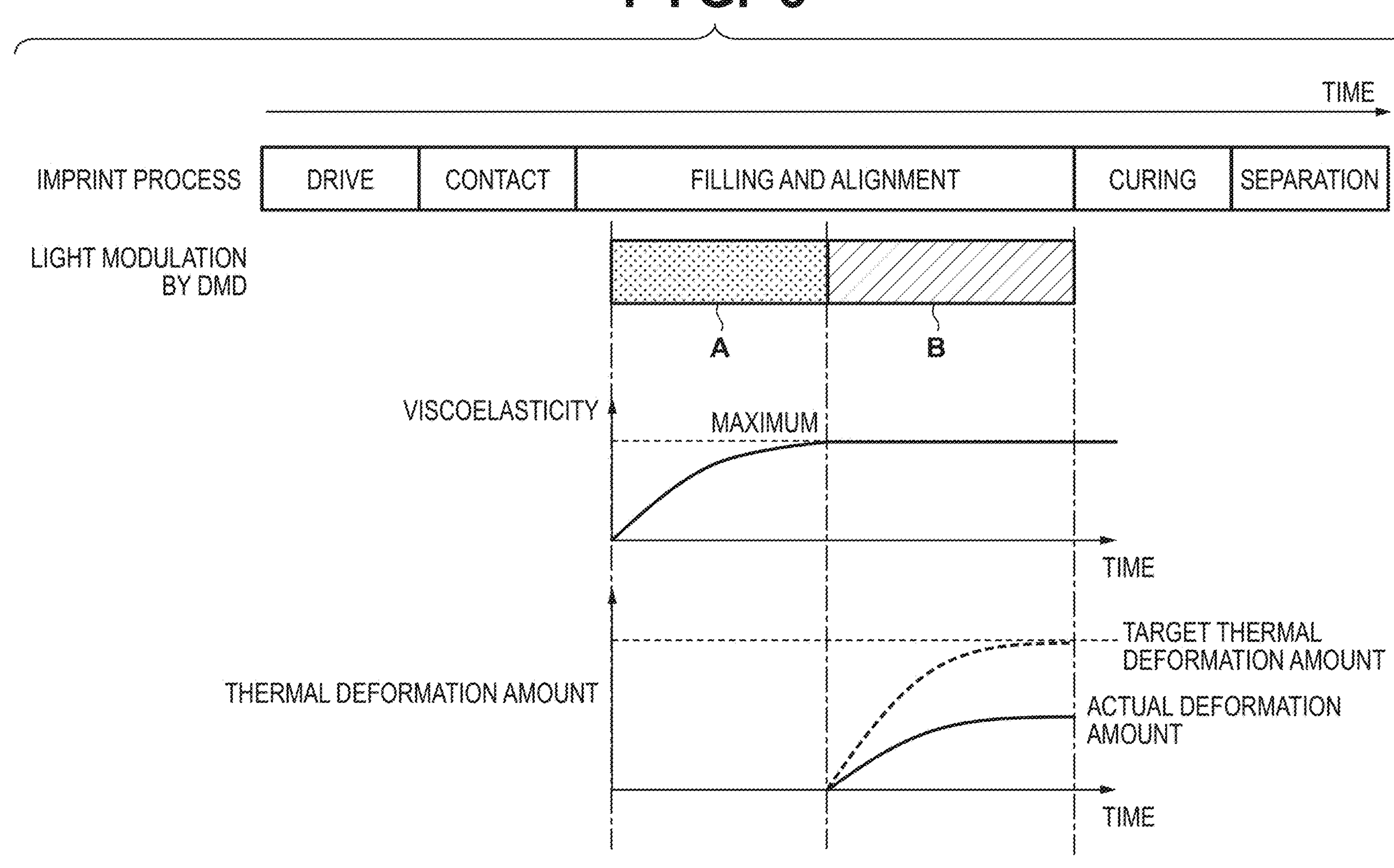

TIME
IMPRINT PROCESS
DRIVE
CONTACT
FILLING AND ALIGNMENT
CURING
SEPARATION
LIGHT MODULATION BY DMD
A
B
A
B
VISCOELASTICITY
MAXIMUM
THRESHOLD Sa
TIME
TARGET THERMAL DEFORMATION AMOUNT
THERMAL DEFORMATION AMOUNT
THRESHOLD Sb
ACTUAL DEFORMATION AMOUNT
TIME

FIG. 5

FIG. 6A
MARK
M,S
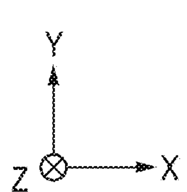
FIG. 6B
12
MARK
M
MARK
S
Z
X
Y
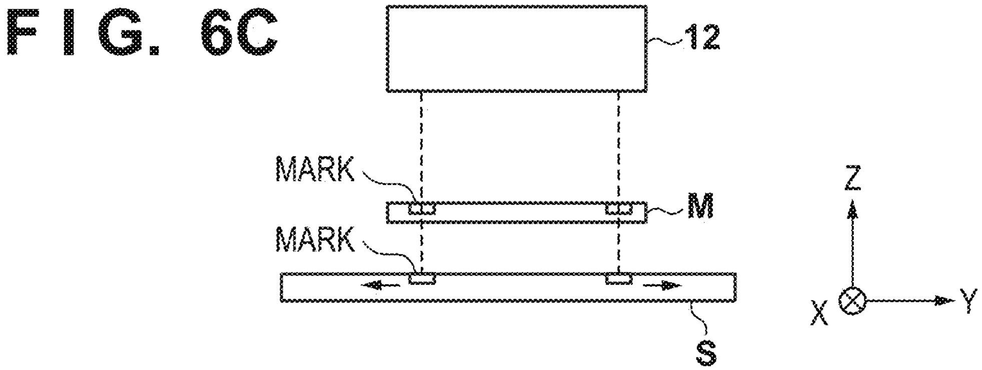
FIG. 6C
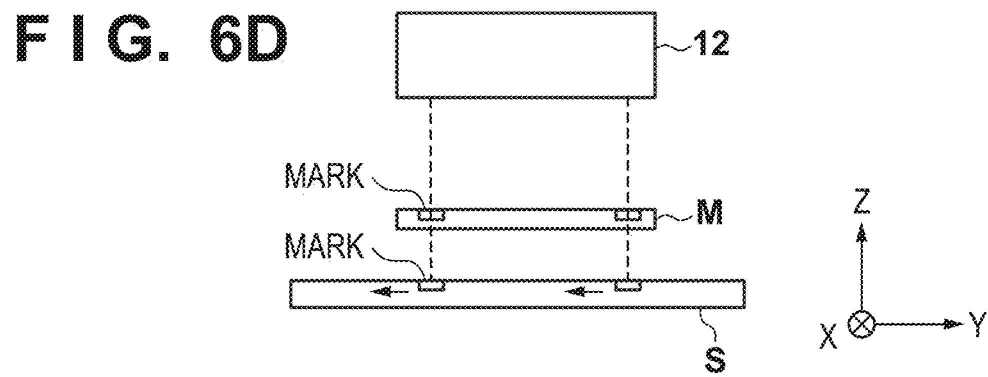
FIG. 6D

IMPRINT APPARATUS AND ARTICLE MANUFACTURING METHOD

BACKGROUND OF THE INVENTION

Field of the Invention

The present invention relates to an imprint apparatus and an article manufacturing method.

Description of the Related Art

There is an imprint apparatus that brings a mold into contact with an imprint material on a substrate and cures the imprint material, thereby forming a pattern made of a cured product of the imprint material on the substrate. Japanese Patent Laid-open No. 2016-058735 discloses that, in order to improve the alignment accuracy between a mold and a substrate, light is applied to at least a part of an imprint material on the substrate to increase the viscoelasticity of the imprint material during alignment (preliminary exposure step). Japanese Patent Laid-Open No. 2013-102132 discloses that the pattern region of a substrate is heated to decrease the shape difference between the pattern region of a mold and the pattern region of the substrate (heating step).

In an alignment step, it is conceivable to sequentially perform the preliminary exposure step and the heating step as described above.

However, if the viscoelasticity of the imprint material is increased to the maximum in the preliminary exposure step, the bonding force between the substrate and the mold increases. In this case, in the subsequent heating step, the pattern region of the substrate cannot be deformed into a target shape, so that it can be difficult to achieve the desired alignment accuracy.

SUMMARY OF THE INVENTION

The present invention provides a technique advantageous in improving alignment accuracy.

The present invention in its one aspect provides an imprint apparatus that performs alignment between a substrate and a mold in a state in which the mold is in contact with an imprint material on the substrate, and then cures the imprint material by light irradiation, the apparatus including a light irradiator configured to perform first light irradiation for partially curing the imprint material, and second light irradiation for deforming the substrate, and a controller configured to control the light irradiator, wherein, in the alignment, the controller performs switching between the first light irradiation and the second light irradiation based on a viscoelasticity of the imprint material or a deformation amount of the substrate.

Further features of the present invention will become apparent from the following description of exemplary embodiments (with reference to the attached drawings).

BRIEF DESCRIPTION OF THE DRAWINGS

FIG. 3 is a view for explaining a conventional imprint process;

FIG. 5 is a view showing the relationship between the viscoelasticity of an imprint material and the vibration amount of a substrate stage;

FIGS. 6A to 6D are views for explaining an alignment mark measurement method by a detector;

DESCRIPTION OF THE EMBODIMENTS

Figure 1:
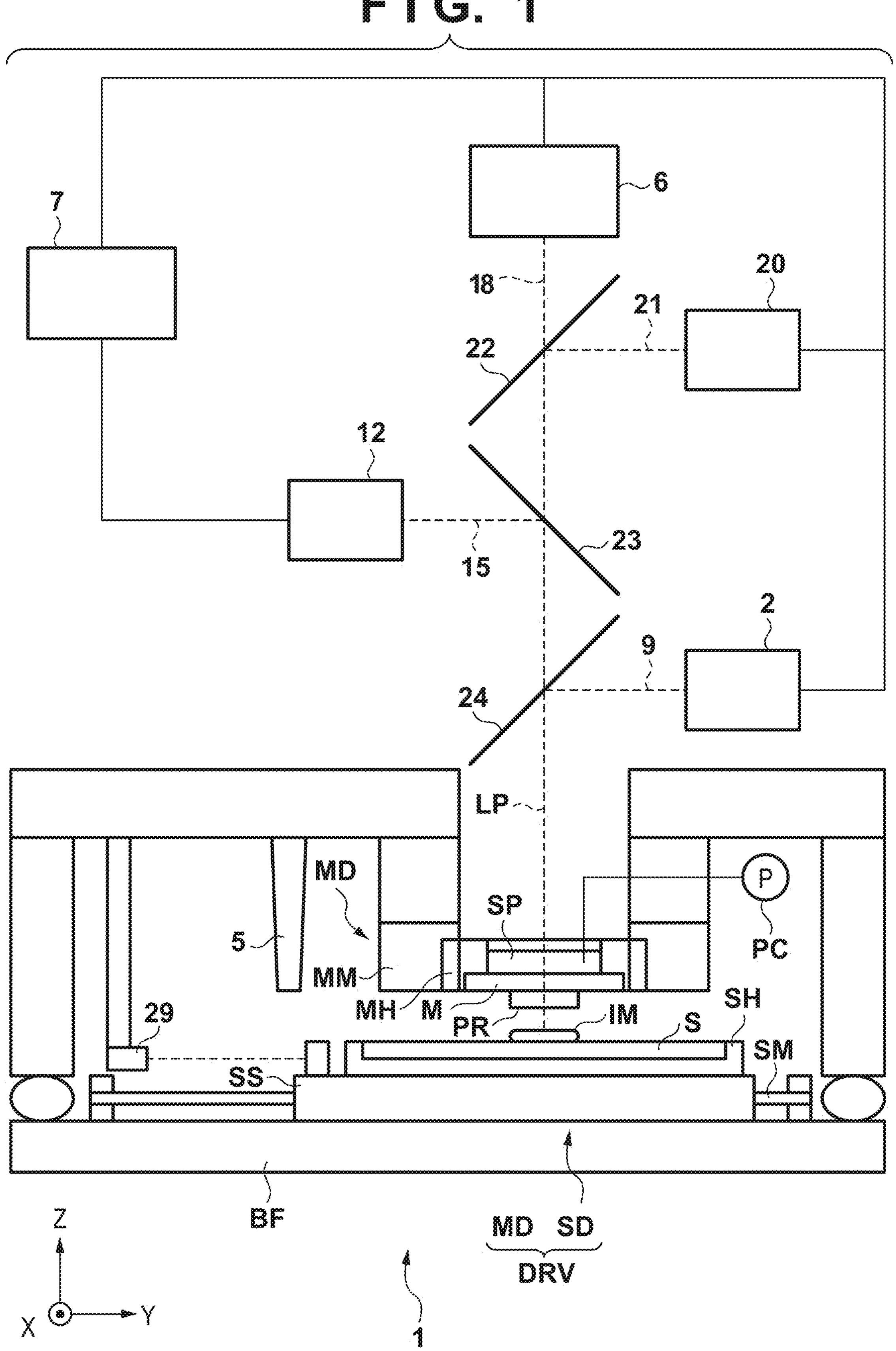
FIG. 1 is a view showing the arrangement of an imprint apparatus.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate.

Furthermore, in the attached drawings, the same reference numerals are given to the same or similar configurations, and redundant description thereof is omitted.

First Embodiment

FIG. 1 shows the arrangement of an imprint apparatus 1 in an embodiment. The imprint apparatus 1 executes an imprint process, thereby forming a pattern made of a cured product of an imprint material IM on a substrate S. The imprint process can include a contact step, an alignment step, and a curing step. The contact step is a step of bringing the imprint material IM on the substrate S and a mold M into contact with each other. The alignment step is a step of aligning the substrate S and the mold M after the contact step. The curing step is a step of curing the imprint material IM by light irradiation after the alignment step.

The imprint material is a photo-curable composition which is cured by light irradiation. The photo-curable composition contains at least a polymerizable compound and a photopolymerization initiator, and may further contain a nonpolymerizable compound or a solvent, as needed. The nonpolymerizable compound is at least one type of material selected from a group consisting of a sensitizer, a hydrogen donor, an internal mold release agent, a surfactant, an antioxidant, a polymer component, and the like. The imprint material can be arranged on a substrate in a droplet shape or in an island or film shape formed by connecting a plurality of droplets. The viscosity (the viscosity at 25° C.) of the imprint material can be, for example, 1 mPa·s (inclusive) to 100 mPa·s (inclusive). As the material of a substrate, for example, glass, ceramic, a metal, a semiconductor, a resin, or the like can be used. A member made of a material different from that of the substrate may be formed on the surface of the substrate, as needed. The substrate is, for example, a silicon wafer, a semiconductor compound wafer, or silica glass.

In the specification and the accompanying drawings, directions will be indicated on an XYZ coordinate system in which directions parallel to the surface of the substrate S are defined as the X-Y plane. Directions parallel to the X-axis, the Y-axis, and the Z-axis of the XYZ coordinate system are the X direction, the Y direction, and the Z direction, respectively. A rotation about the X-axis, a rotation about the Y-axis, and a rotation about the Z-axis are θX, θY, and θZ, respectively. Control or driving concerning the X-axis, the Y-axis, and the Z-axis means control or driving concerning a direction parallel to the X-axis, a direction parallel to the Y-axis, and a direction parallel to the Z-axis, respectively. In addition, control or driving concerning the θX-axis, the θY-axis, and the θZ-axis means control or driving concerning a rotation about an axis parallel to the X-axis, a rotation about an axis parallel to the Y-axis, and a rotation about an axis parallel to the Z-axis, respectively. In addition, a position is information that can be specified based on coordinates on the X-, Y-, and Z-axes, and an orientation is information that can be specified by values on the θX-, θY-, and θZ-axes. Alignment between the substrate S or a region thereof and the mold M or a region thereof can include controlling the position and/or the posture of at least one of the substrate S and the mold M. In addition, alignment can include control to correct or change the shape of at least one of the substrate S and the mold M.

The imprint apparatus 1 can include a substrate driving mechanism SD that holds and drives the substrate S, a base frame BF that supports the substrate driving mechanism SD, and a mold driving mechanism MD that holds and drives the mold M. The substrate driving mechanism SD and the mold driving mechanism MD form a driving mechanism DRV that drives at least one of the substrate driving mechanism SD and the mold driving mechanism MD to adjust the relative position between the substrate S and the mold M. Adjustment of the relative position by the driving mechanism DRV includes driving for bringing the mold M into contact with the imprint material IM on the substrate S and separating the mold M from the cured imprint material IM (a pattern of a cured product).

The substrate driving mechanism SD can include a substrate holder SH that holds the substrate S, a substrate stage SS that supports the substrate holder SH, and a substrate driving actuator SM that drives the substrate S by driving the substrate stage SS. The substrate driving mechanism SD can be configured to drive the substrate S in a plurality of axes (for example, three axes of the X-axis, the Y-axis, and the θZ-axis, and preferably six axes of the X-axis, the Y-axis, the Z-axis, the θX-axis, the θY-axis, and the θZ-axis). Control of the position and posture of the substrate S can be performed based on a measurement result obtained by measuring the position and posture of the substrate S by a measurement device 29.

The mold driving mechanism MD can include a mold holder MH that holds the mold M, and a mold driving actuator MM that drives the mold M by driving the mold holder MH. The mold holder MH can include a mold deformation mechanism that deforms the mold M. The mold deformation mechanism can deform the mold M by, for example, applying a force to the side surface of the mold M. The mold driving mechanism MD can be configured to drive the mold M in a plurality of axes (for example, three axes of the Z-axis, the θX-axis, and the θY-axis, and preferably six axes of the X-axis, the Y-axis, the Z-axis, the θX-axis, the θY-axis, and the θZ-axis). The mold M includes a pattern region where a pattern to be transferred to the imprint material IM on the substrate S by the imprint process has been formed. The mold driving mechanism MD can include a pressure regulator PC that regulates the pressure in a space SP on the back surface side (the opposite side of a pattern region PR) of the mold M to deform the mold M (pattern region PR thereof) into a convex shape toward the substrate S, and flatten the mold M, or the like. The pressure regulator PC can regulate the pressure in the space SP such that bringing the imprint material IM on the substrate S into contact with the pattern region PR is started in a state in which the mold M has been deformed into a convex shape toward the substrate S, and after that, the contact region between the imprint material IM and the pattern region PR gradually increases.

The imprint apparatus 1 can include a dispenser 5 that supplies, applies, or arranges the imprint material IM on the substrate S. However, the imprint material IM may be supplied, applied, or arranged on the substrate S in an external apparatus of the imprint apparatus 1.

The imprint apparatus 1 can include a light source (curing light source) 2 configured to emit light 9 (curing light) for curing the imprint material IM to an optical path LP to irradiate the imprint material IM between the substrate S and the mold M (pattern region PR thereof) in the curing step. The optical path LP is an optical path leading to the substrate S via the mold M and the imprint material IM. The imprint apparatus 1 can further include a detector 12 that detects the relative position between an alignment mark provided in the substrate S and an alignment mark provided in the mold M. The detector 12 can illuminate the alignment mark provided in the substrate S and the alignment mark provided in the mold M with detection light 15, and capture an image formed by these alignment marks. The detection light 15 is also understood as light emitted to the optical path LP.

The imprint apparatus 1 can further include an imaging device 6 configured to detect the contact state between the imprint material IM on the substrate S and the mold M (pattern region PR thereof) or the filling state of the imprint material IM with respect to the space between the substrate S and the mold M (pattern region PR thereof). In addition, the imaging device 6 can also be used to detect a foreign substance between the substrate S and the mold M. The imaging device 6 can illuminate a stacked structure formed by the substrate S, the imprint material IM, and the mold M with observation light 18, and capture an image formed by the stacked structure. The observation light 18 is also understood as light emitted to the optical path LP.

The imprint apparatus 1 can further include a light source unit 20 (light irradiator) that emits modulated light 21 to the optical path LP. As will be described later, the light source unit 20 includes a spatial light modulator, and emits, to the optical path LP, the modulated light 21 which is light modulated by the spatial light modulator. The modulated light 21 can include the first modulated light which partially cures the imprint material IM, and the second modulated light which deforms the substrate S for alignment between the substrate S and the mold M. It is preferable that the second modulated light is not emitted to the optical path LP when the first modulated light is emitted to the optical path LP, and the first modulated light is not emitted to the optical path LP when the second modulated light is emitted to the optical path LP. However, both the first modulated light and the second modulated light may be emitted to the optical path LP in a sufficiently short period during the period in which the modulated light 21 is emitted to the optical path LP. The first modulated light and the second modulated light are light beams whose wavelength ranges do not overlap each other. Alternatively, the first modulated light and the second modulated light can be light beams having peaks at different wavelengths.

The first modulated light has a wavelength which cures the imprint material IM, in other words, a wavelength which increases the viscosity (viscoelasticity) of the imprint material IM. The first modulated light can be light modulated so as to increase the viscosity of the imprint material IM in an arbitrary portion of the pattern formation region of the substrate S, thereby increasing the bonding force between the substrate S and the mold M by the imprint material IM. Irradiation of the first modulated light (first light irradiation) can be referred to as damping exposure, and can be executed in the alignment step to improve the alignment accuracy. In a state in which the bonding force between the substrate S and the mold M by the imprint material IM is weak (before irradiation of the first modulated light), the substrate S and the mold M can be individually vibrated due to disturbance or the like (that is, the relative vibration between the substrate S and the mold M is large). By irradiating the imprint material IM with the first modulated light to partially increase the viscosity of the imprint material IM and increase the bonding force between the substrate S and the mold M, it is possible to reduce the relative vibration between the substrate S and the mold M, thereby improving the convergence of alignment. In an example, increasing the viscosity (viscoelasticity) of the imprint material IM by irradiation of the first modulated light such that the magnitude of the shear force generated by relative movement between the substrate S and the mold M falls within a range of 0.5 N to 1.0 N is effective to improve the convergence of alignment.

The second modulated light can be light modulated so as to form, on the substrate S, a light intensity distribution (illuminance distribution) which deforms the substrate S, more specifically, the pattern formation region (shot region) of the substrate S into a target shape. By irradiating the substrate S with the second modulated light (second light irradiation), a temperature distribution is formed on the substrate S, and this temperature distribution deforms the pattern formation region of the substrate S so as to approach the target shape. When the alignment between the pattern formation region of the substrate S and the pattern region PR of the mold M is completed, the curing step (the step of irradiating the imprint material IM with the curing light by the curing light source 2 to cure the imprint material IM) is executed. The second modulated light is light having a wavelength which does not cure the imprint material IM.

The optical axes of the curing light source 2, the detector 12, the imaging device 6, and the light source unit 20 share the optical path LP. To implement this, a combining mirror 22 and dichroic mirrors 23 and 24 are provided. The combining mirror 22 transmits the observation light 18 but reflects the modulated light 21. The dichroic mirror 23 transmits the observation light 18 and the modulated light 21 but reflects the detection light 15. The dichroic mirror 24 transmits the observation light 18, the modulated light 21, and the detection light 15 but reflects the curing light 9.

The imprint apparatus 1 can further include a controller 7 that controls the substrate driving mechanism SD, the mold driving mechanism MD, the pressure regulator PC, the dispenser 5, the measurement device 29, the curing light source 2, the detector 12, the imaging device 6, the light source unit 20, and the like described above. The controller 7 can be formed from, for example, a Programmable Logic Device (PLD) such as a Field Programmable Gate Array (FPGA), an Application Specific Integrated Circuit (ASIC), a general-purpose or dedicated computer installed with a program, or a combination of all or some of these components.

Figure 2:
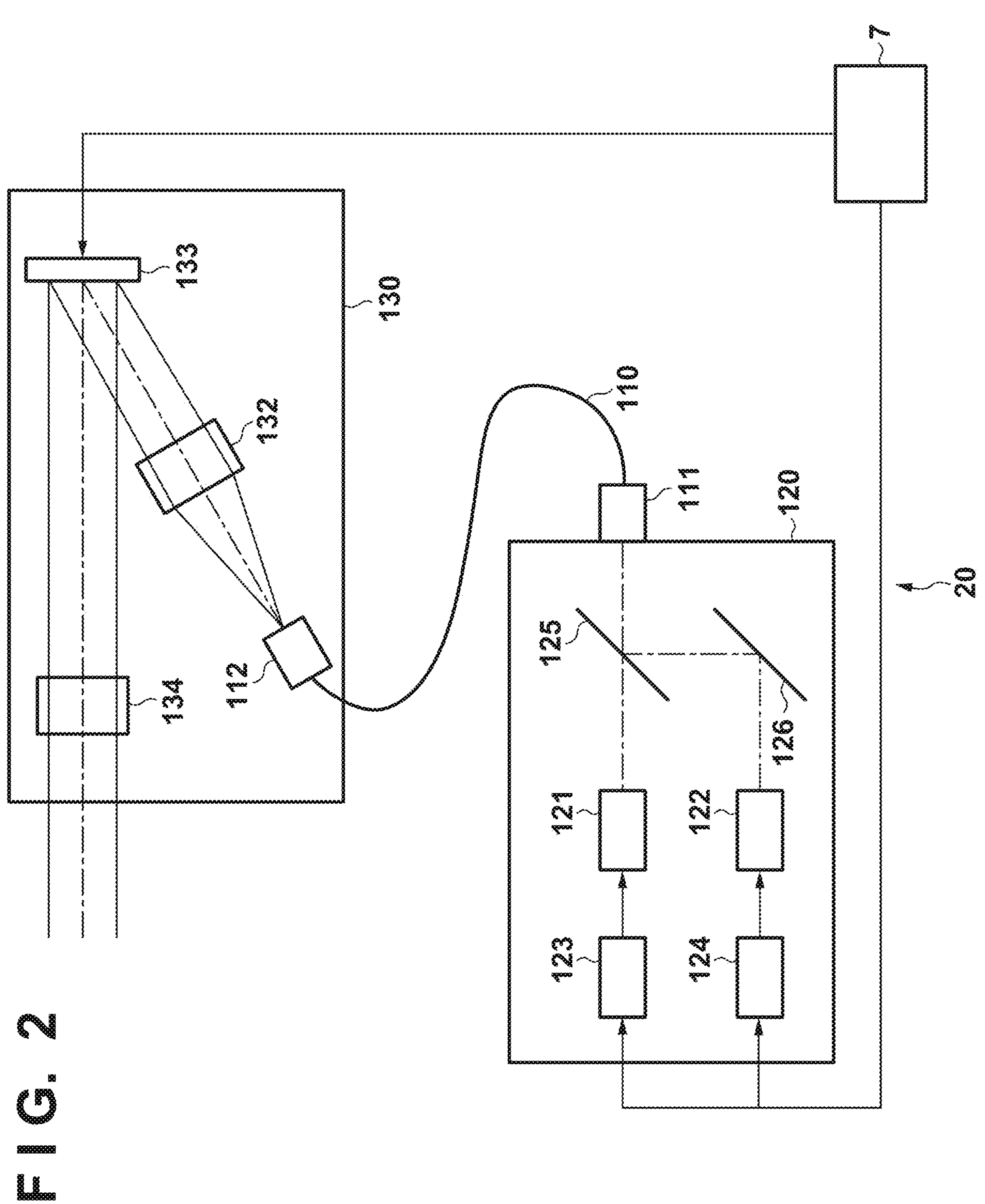
FIG. 2 is a view showing an example of the arrangement of a light source unit.

FIG. 2 shows an example of the arrangement of the light source unit 20. The light source unit 20 can include a first light source 121 that generates the first light having the first wavelength range for generating the first modulated light, and a second light source 122 that generates the second light having the second wavelength range for generating the second modulated light. The light source unit 20 can further include a digital mirror device (DMD) 133 serving as the spatial light modulator that generates the first modulated light obtained by modulating the first light and the second modulated light obtained by modulating the second light. The light source unit 20 can also include an optical system (125, 126, 111, and 132) that makes the first light from the first light source 121 and the second light from the second light source 122 enter the DMD 133 serving as the spatial light modulator.

In an example, the light source unit 20 can be formed by connecting an illumination unit 120 and a modulation unit 130 by an optical fiber 110. The illumination unit 120 can include the first light source 121, the second light source 122, a first controller 123, a second controller 124, and the mirrors 125 and 126. The optical path of the first light generated by the first light source 121 and the optical path of the second light generated by the second light source 122 are combined by the mirrors 125 and 126 and connected to an incident part 111 of the optical fiber 110. An emission part 112 of the optical fiber 110 is connected to the modulation unit 130.

The first controller 123 controls the first light source 121 in accordance with an instruction from the controller 7. Control of the first light source 121 can include control the turning on and turning off of the first light source 121. Control of the first light source 121 may further include control of the intensity of the first light generated by the first light source 121. For example, the first controller 123 can include a constant current circuit that supplies, to the first light source 121, a current having a current value according to an instruction value from the controller 7. Alternatively, the first controller 123 can include a driving circuit that drives the first light source 121 in accordance with an instruction value, and a photoelectric conversion sensor that receives part of the first light generated by the first light source 121, and have a configuration to feed back the output of the photoelectric conversion sensor to the driving circuit.

The second controller 124 controls the second light source 122 in accordance with an instruction from the controller 7. Control of the second light source 122 can include control the turning on and turning off of the second light source 122. Control of the second light source 122 may further include control of the intensity of the second light generated by the second light source 122. For example, the second controller 124 can include a constant current circuit that supplies, to the second light source 122, a current having a current value according to an instruction value from the controller 7. Alternatively, the second controller 124 can include a driving circuit that drives the second light source 122 in accordance with an instruction value, and a photoelectric conversion sensor that receives part of the second light generated by the second light source 122, and have a configuration to feed back the output of the photoelectric conversion sensor to the driving circuit.

The controller 7 can individually control the first light source 121 and the second light source 122. For example, the controller 7 can control the first light source 121 and the second light source 122 such that when turning on one of the first light source 121 and the second light source 122, the other is turned off. In another point of view, an arrangement can be employed in which, when one of the first light from the first light source 121 and the second light from the second light source 122 enters the spatial light modulator (DMD 133), the other of the first light and the second light does not enter the spatial light modulator. This is implemented by, for example, controlling the first and second light sources 121 and 122 by the first and second controllers 123 and 124, or a mechanism that selectively blocks one of the first light and the second light.

Here, an example of wavelength assignment for the curing light 9, the detection light 15, the observation light 18, and the modulated light 21 (the first modulated light and the second modulated light) will be described. The curing light 9 is light which cures the imprint material IM. In an example, the curing light 9 can have an arbitrary wavelength range within a range of 300 nm to 380 nm, but may have a wavelength range of 300 nm or less. The detection light 15 is light for detecting the alignment mark. In an example, the detection light 15 has a wavelength range of 550 nm to 750 nm. The observation light 18 is light for observing the contact state between the imprint material IM and the mold M, the filling state of the imprint material IM with respect to the space between the substrate S and the mold M, and the like. For the observation light 18, for example, a wavelength range not overlapping the wavelength ranges of the curing light 9 and the detection light 15 can be selected from a wavelength range of 400 nm to 480 nm. The modulated light 21 includes the first modulated light having a wavelength range where the imprint material IM is cured, and the second modulated light having a wavelength range where the imprint material IM is not cured.

For the modulated light 21, a wavelength range similar to that of the observation light 18, for example, a wavelength range not overlapping the wavelength ranges of the curing light 9 and the detection light 15 can be selected from a wavelength range of 400 nm to 480 nm. The first modulated light is generated by modulating, by the modulation unit 130 (DMD 133), the first light generated by the first light source 121. The second modulated light is generated by modulating, by the modulation unit 130 (DMD 133), the second light generated by the second light source 122. The wavelength of the first light generated by the first light source 121 and the wavelength of the second light generated by the second light source 122 can be decided from the upper limit of the wavelength range where the imprint material IM is cured. For example, if the upper limit of the wavelength range where the imprint material IM is cured is 440 nm, the wavelength of the first light generated by the first light source 121 can be set to about 410 nm, and the wavelength of the second light generated by the second light source 122 can be set to about 460 nm. Each of the first light source 121 and the second light source 122 is preferably a light source that generates single wavelength light having a short wavelength width. For example, a laser diode is suitable for it. The laser diode is superior in that it can be quickly switched between being turned on and turned off.

The light transmitted to the modulation unit 130 via the optical fiber 110 enters the DMD 133 serving as the spatial light modulator via the optical system 132. The optical system 132 can include, for example, a condensing optical system and an illumination optical system (for example, microlens array) that uniformizes the light from the condensing optical system and illuminates the DMD 133. The DMD 133 includes a plurality of micromirrors (not shown) that reflect light, and actuators that respectively drive the plurality of micromirrors. In accordance with an instruction from the controller 7, each actuator controls the corresponding micromirror to an angle of −12° (ON state) or +12° (OFF state) with respect to the array plane of the plurality of micromirrors. The light reflected by the micromirror in the ON state serves as the modulated light and forms an image on the substrate S via an optical system 134 (projection optical system) that sets the DMD 133 and the substrate S in a conjugate relationship with the optical system. The light reflected by the micromirror in the OFF state is reflected to a direction of not reaching the substrate S. The region (maximum irradiation region) projected to the substrate S in a case of setting all the micromirrors in the ON state is larger than the size of the maximum pattern formation region of the substrate S. In place of the DMD 133, another spatial light modulator, for example, a liquid crystal display (LCD) may be employed.

The optical system forming the modulation unit 130 needs to transmit both the first light (first modulated light) having the wavelength which cures the imprint material IM, and the second light (second modulated light) having the wavelength which does not cure the imprint material IM. In addition, in a general DMD, at the wavelength of 420 nm or less, the maximum light intensity that can be applied to the micromirror array decreases. Furthermore, at the wavelength near 400 nm, which is the boundary between ultraviolet light and visible light, the maximum light intensity that can be applied to the micromirror array extremely decreases to about 1/1000. Therefore, it is desirable to use a laser diode or the like having a short wavelength width to bring the wavelengths of the first light source 121 and the second light source 122 close to the upper limit of the wavelength range where the imprint material IM is cured.

For example, based on the light intensity distribution (illuminance distribution) data to be formed on the surface of the substrate S, the controller 7 can generate control data for controlling switching between the ON state and the OFF state of each micromirror of the DMD 133. The light intensity distribution data can include, for example, information concerning the time of setting each micromirror in the ON state, and information concerning the time of setting each micromirror in the OFF state. The larger the number of micromirrors in the ON state and the longer the time in the ON state, the larger the exposure amount that can be applied to the pattern formation region of the substrate S.

The controller 7 can include a memory that stores light intensity distribution data used to generate the first modulated light by modulating the first light, and light intensity distribution data used to generate the second modulated light by modulating the second light. The light intensity distribution data used to generate the first modulated light by modulating the first light can include light intensity distribution data for increasing the viscosity of the imprint material IM in an arbitrary portion of the pattern formation region of the substrate S to increase the bonding force between the substrate S and the mold M via the imprint material IM.

The arrangement in which the modulation unit 130 is shared by the first light source 121 and the second light source 122 is advantageous in miniaturizing the modulation unit 130 or the light source unit 20 and accordingly simplifying the structure of the imprint apparatus 1. This facilitates arrangement of the modulation unit 130 near the optical path LP. The arrangement in which the illumination unit 120 and the modulation unit 130 are separated from each other is advantageous in arranging the illumination unit 120 to be a heat source at a position far from the optical path LP of the imprint apparatus 1. However, the illumination unit 120 and the modulation unit 130 may be arranged close to each other without using the optical fiber 110. Alternatively, the illumination unit 120 may be incorporated in the modulation unit 130. Alternatively, the first light source 121 and the modulation unit 130 may be connected by the first optical fiber, and the second light source 122 and the modulation unit 130 may be connected by the second optical fiber. In this case, the optical path of the first light emitted from the first optical fiber and the optical path of the second light emitted from the second optical fiber can be coupled.

FIG. 3 shows a conventional example of the operation of the light source unit 20 in an imprint process executed by the imprint apparatus 1. The imprint process can include a contact step of bringing the imprint material IM on the substrate S and the mold M into contact with each other, and an alignment step of aligning the substrate S and the mold M after the contact step. The imprint process can further include a curing step of curing the imprint material IM after the alignment step, and a separation step of separating the mold M from the cured imprint material IM. The contact step is a step of bringing the imprint material IM on the substrate S and the mold M (pattern region PR thereof) into contact with each other by the driving mechanism DRV. The contact step can correspond to a period that starts when the imprint material IM on the substrate S and the pattern region PR of the mold M deformed into a convex shape starts to contact and ends when the entire region of the pattern region PR is flattened. As a step accompanying the contact step, the imprint process includes a driving step of bringing the imprint material IM on the substrate S and the mold M close to each other by the driving mechanism DRV. FIG. 3 shows the timing of each step of the imprint process along a time axis.

In the alignment step, based on the result detected by the detector 12, at least one of the substrate S and the mold M is driven by the driving mechanism DRV to align the pattern formation region of the substrate S and the pattern region PR of the mold M. Further, in the alignment step, based on the result detected by the detector 12, the mold M can be deformed by the mold driving mechanism to align the pattern formation region of the substrate S and the pattern region PR of the mold M. Furthermore, in the alignment step, based on the result detected by the detector 12, a heating step to be described later can be executed to align the pattern formation region of the substrate S and the pattern region PR of the mold M.

A filling step progresses in parallel with the alignment step. In the filling step, the imprint material IM between the substrate S and the pattern region PR of the mold M is filled into a concave portion forming the pattern of the pattern region PR, and a gap existing between the substrate S and the pattern region PR of the mold M disappears. In an example, the filling step can be started prior to the alignment step. FIG. 3 further shows the timing of light modulation by the DMD 133 of the light source unit 20. The light modulation by the DMD 133 is performed in different modes in a preliminary exposure step A and a heating step B. In the preliminary exposure step A, the first modulated light generated by modulating the first light, which is light in the wavelength range where the imprint material IM is cured, is emitted to the optical path LP. In the preliminary exposure step A, the viscosity of the imprint material IM in a predetermined portion of the pattern formation region of the substrate S is increased (damping exposure). By partially increasing the viscosity of the imprint material IM, the bonding force between the substrate S and the mold M increases. Accordingly, the relative vibration between the substrate S and the mold M is reduced. In the heating step B, the second modulated light generated by modulating the second light, which is light in the wavelength range where the imprint material IM is not cured, is emitted to the optical path LP. The period (timing and time length) of the preliminary exposure step A is appropriately decided such that a desired degree of vibration reduction is obtained. In the heating step B, for alignment between the pattern formation region of the substrate S and the pattern region PR of the mold M, the second modulated light is applied to the pattern formation region of the substrate S to heat the substrate S, thereby deforming the pattern formation region of the substrate S. The period (timing and time length) of the heating step B can be decided such that, at the time of curing the imprint material IM by the curing light 9 from the curing light source 2 in the curing step, the pattern formation region of the substrate S has a target shape.

If the viscoelasticity of the imprint material IM is increased to the maximum in the preliminary exposure step A, the bonding force between the substrate S and the mold M excessively increases. In this case, in the heating step B to be executed after that, the deformation of the pattern formation region of the substrate S may not be performed as intended.

FIG. 3 shows an example of the change of the viscoelasticity of the imprint material IM in the section of the preliminary exposure step A. In this example, it is assumed that the viscoelasticity of the imprint material IM is increased to the maximum in the preliminary exposure step A. FIG. 3 further shows an example of the change of the thermal deformation amount of the pattern formation region of the substrate S in the section of the heating step B. This example shows that the actual thermal deformation amount of the pattern formation region of the substrate S remains at about 50% of the target thermal deformation amount. As a result, accurate alignment between the pattern formation region of the substrate S and the pattern region PR of the mold Mis disabled.

Figure 4:
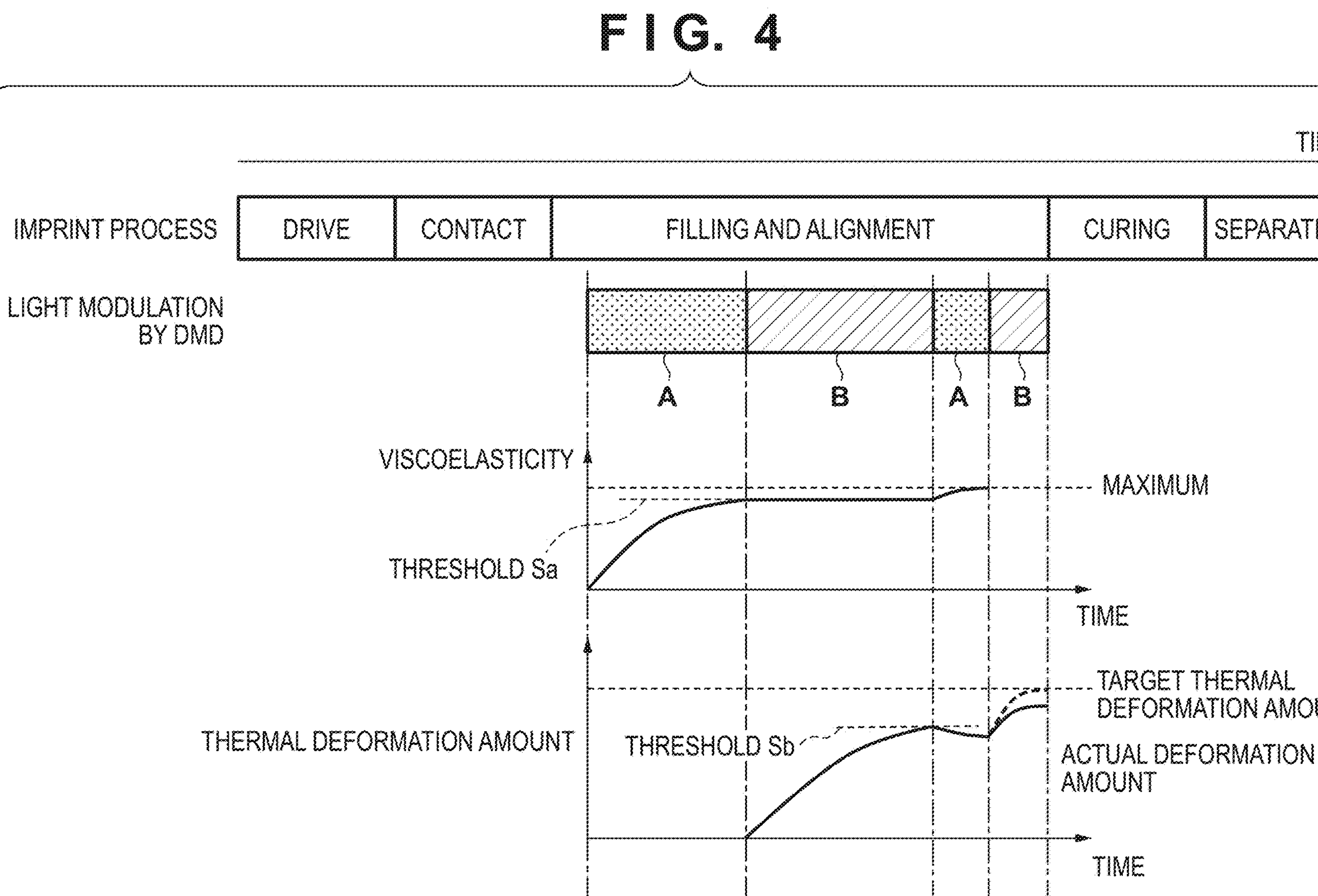
FIG. 4 is a view for explaining an imprint process in an embodiment.

FIG. 4 shows an example of the imprint process in the embodiment. In this embodiment, as has been described above, the light source unit 20 (light irradiator) can perform the first light irradiation for partially curing an imprint material, and the second light irradiation for deforming a substrate. In this embodiment, the controller 7 performs switching between the first light irradiation and the second light irradiation in the alignment step based on the viscoelasticity of the imprint material IM or the deformation amount of the substrate S.

Figure 5:
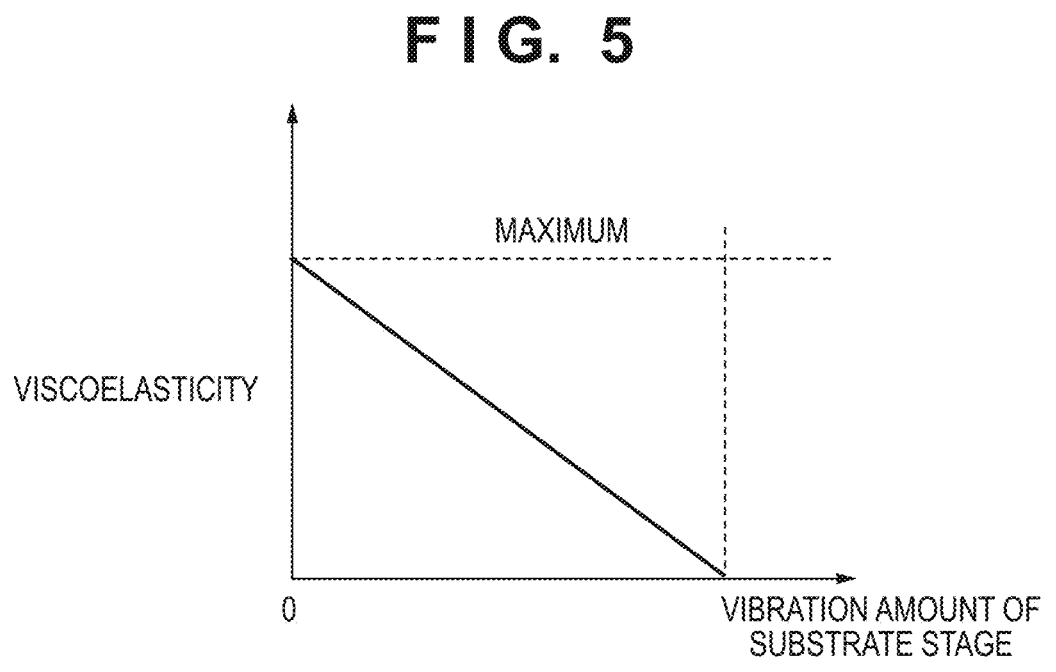

As shown in FIG. 4, in the alignment step, the preliminary exposure step A is executed. When the preliminary exposure step A is executed, the first modulated light is applied so that the viscoelasticity of the imprint material IM gradually increases. In the preliminary exposure step A, the controller 7 monitors the state of the viscoelasticity of the imprint material IM. As has been described above, the first modulated light emitted in the preliminary exposure step A increases the viscoelasticity of the imprint material IM in the pattern formation region of the substrate S, thereby reducing the relative vibration between the substrate S and the mold M. As the viscoelasticity increases, the vibration amount of the substrate S decreases. An example of the relationship between the viscoelasticity of the imprint material IM and the vibration amount of the substrate S is shown in FIG. 5. The controller 7 can calculate the viscoelasticity of the imprint material IM based on the result obtained by measurement of the measurement device 29 measuring the position (vibration amount) of the substrate S or the substrate stage SS which holds and conveys the substrate S, and the relationship obtained in advance shown in FIG. 5. Alternatively, the controller 7 can calculate the viscoelasticity of the imprint material IM based on the image of the stacked structure of the substrate S, the imprint material IM, and the mold M, which is obtained by image capturing by the imaging device 6.

Furthermore, in the preliminary exposure step A, as a determination criterion for terminating the preliminary exposure step A, a threshold value Sa (first threshold value) of the viscoelasticity of the imprint material IM is set. The threshold value Sa is set to, for example, the value of the viscoelasticity in a state in which the bonding force between the substrate S and the mold M is relatively small immediately before the viscoelasticity of the imprint material IM is increased to the maximum. At the timing when the viscoelasticity of the imprint material IM obtained by monitoring exceeds the threshold value Sa, the controller 7 terminates the preliminary exposure step A and starts the heating step B. That is, when the viscoelasticity of the imprint material obtained during execution of the first light irradiation exceeds the threshold value Sa, the controller 7 performs switching from the first light irradiation to the second light irradiation. By executing the heating step B, the second modulated light is applied so that the thermal deformation amount of the pattern formation region of the substrate S gradually increases. In the heating step B, the controller 7 monitors the state of the thermal deformation amount of the pattern formation region of the substrate S. Based on the measurement result by the detector 12 that detects the relative position between the alignment mark provided in the substrate S and the alignment mark provided in the mold M, the controller 7 calculates the thermal deformation amount of the pattern formation region of the substrate S.

FIG. 6A shows an example in which alignment marks are provided at four corners of each of the mold M and the substrate S. FIG. 6B shows that the detector 12 detects the alignment mark provided in the substrate S and the alignment mark provided in the mold M. By executing the heating step B, if a thermal deformation of the pattern formation region of the substrate S occurs in a magnification direction, the state shown FIG. 6C can be detected. By executing the heating step B, if a thermal deformation of the pattern formation region of the substrate S occurs in a shift direction, the state shown in FIG. 6D can be detected. Each of FIGS. 6C and 6D shows an example of measuring a thermal deformation in the Y direction, but a thermal deformation in the X direction is simultaneously measured. Based on these results, the thermal deformation amount of the pattern formation region can be calculated.

In the heating step B, as a determination criterion for terminating the heating step B, a threshold value Sb (second threshold value) of the thermal deformation amount of the pattern formation region of the substrate S is set. The threshold value Sb can be set to, for example, 90% of the maximum deformation amount. At the timing when the thermal deformation amount of the pattern formation region of the substrate S exceeds the threshold value Sb, the controller 7 terminates the heating step B and starts the preliminary exposure step A again. That is, when the deformation amount of the substrate obtained during execution of the second light irradiation exceeds the threshold value Sb, the controller 7 performs switching from the second light irradiation to the first light irradiation.

In the preliminary exposure step A executed again, the viscoelasticity of the imprint material is increased to the maximum. During this preliminary exposure step, the heating step B is turned off, so that the thermal deformation amount of the substrate S can decrease.

After the viscoelasticity of the imprint material is increased to the maximum in the second preliminary exposure step A, the preliminary exposure step A is terminated and the heating step B is executed again. At the time of switching from the preliminary exposure step A to the heating step B, the viscoelasticity of the imprint material has been increased to the maximum. Therefore, although the thermal deformation amount of the pattern formation region of the substrate S is smaller than the target deformation amount, the error in thermal deformation amount finally generated can be suppressed to the minimum.

Second Embodiment

Figure 7:
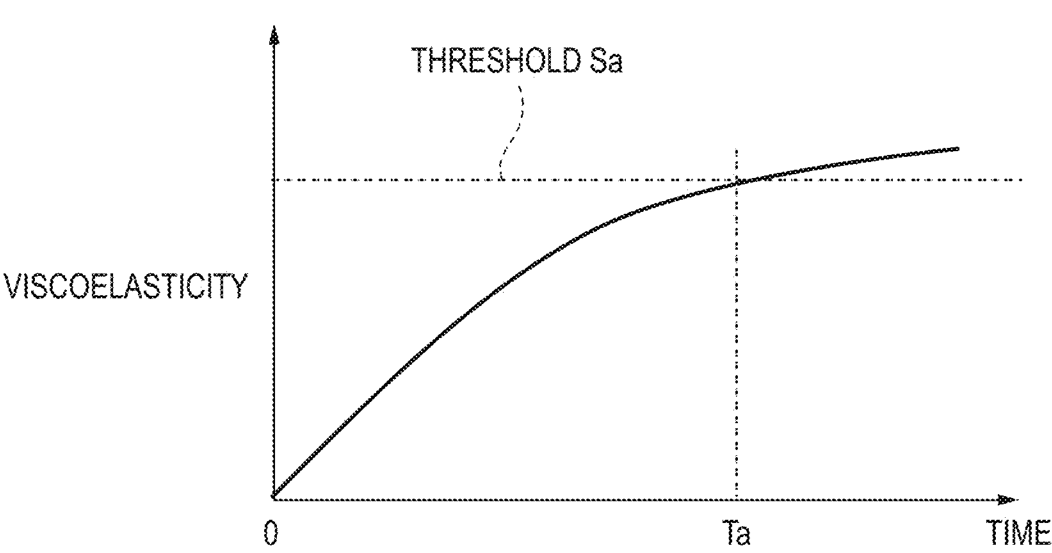
FIG. 7 is a view showing the change of the viscoelasticity of the imprint material in a preliminary exposure step.
Figure 9:
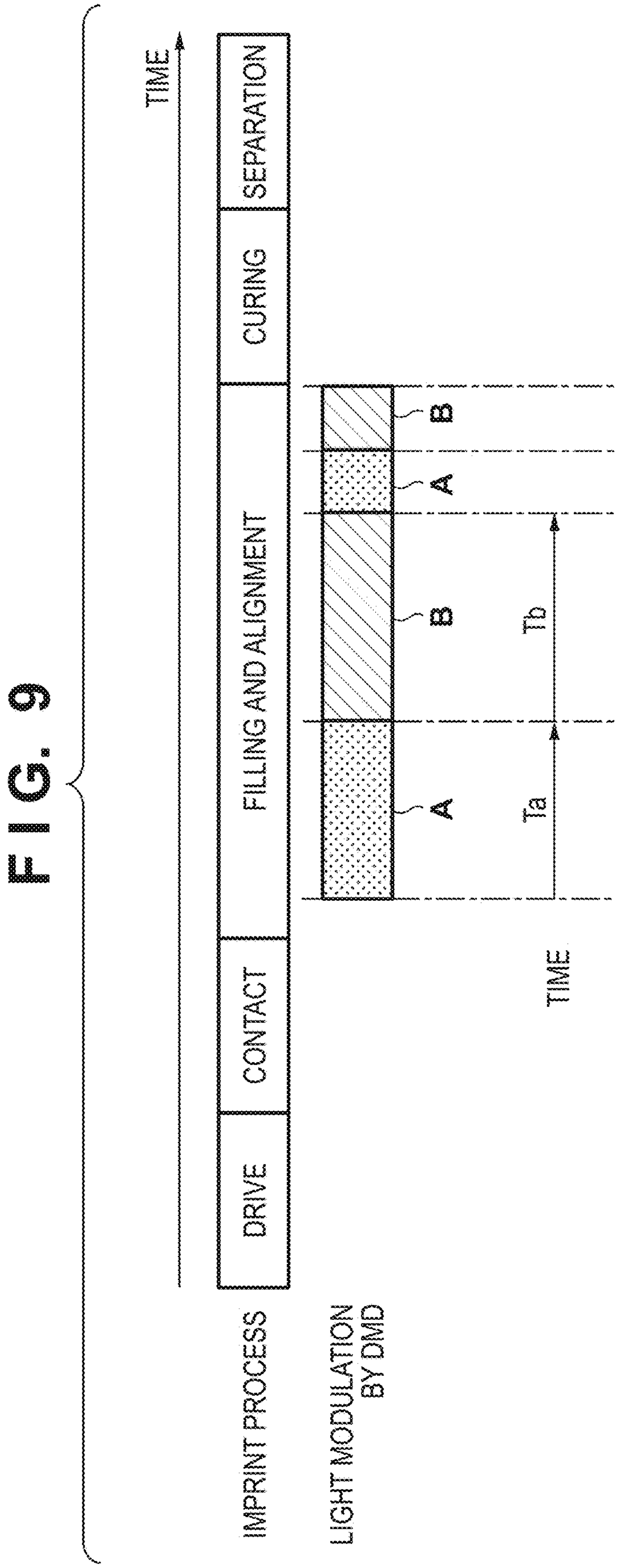
FIG. 9 is a view for explaining an imprint process in an embodiment.

FIG. 7 shows an example of the change of the viscoelasticity of an imprint material IM with respect to the elapsed time. If this relationship is known, a timing Ta when the viscoelasticity reaches a threshold value Sa can be obtained in advance based on the relationship. In this case, as shown in FIG. 9, the preliminary exposure step A may be terminated and transition to a heating step B at the time when the timing Ta has elapsed since the preliminary exposure step A is started. In this manner, in the second embodiment, in the alignment step, a controller 7 performs switching from the first light irradiation to the second light irradiation based on the duration of the first light irradiation.

Figure 8:
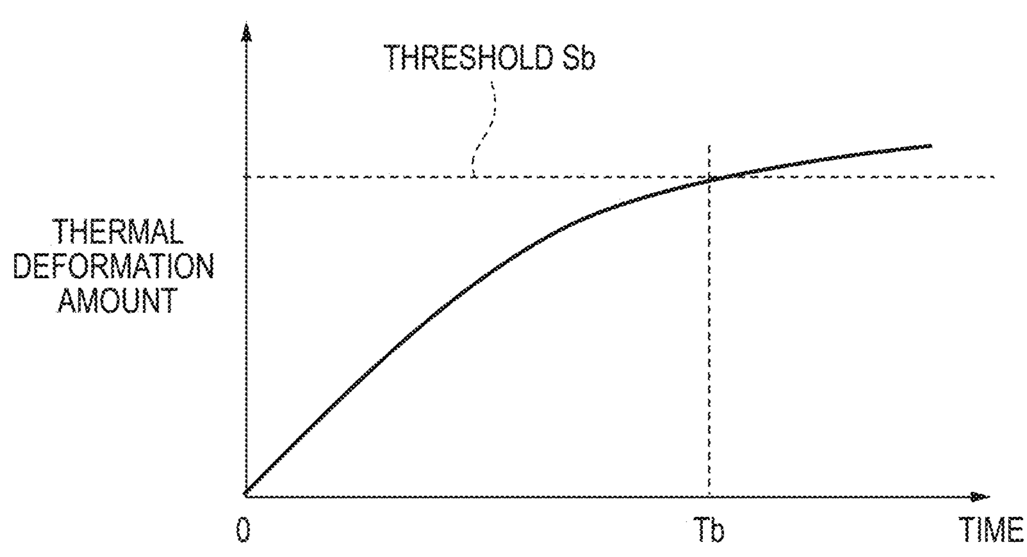
FIG. 8 is a view showing the change of the thermal deformation amount of the pattern formation region of a substrate in a heating step.

FIG. 8 shows an example of the change of the thermal deformation amount of the pattern formation region of a substrate S with respect to the elapsed time. If this relationship is known, a timing Tb when the thermal deformation amount reaches a threshold value Sb can be obtained in advance based on the relationship. In this case, as shown in FIG. 9, the heating step B may be terminated and transition to the second preliminary exposure step A at the time when the timing Tb has elapsed since the heating step B is started. In this manner, in the second embodiment, in the alignment step, the controller 7 performs switching from the second light irradiation to the first light irradiation based on the duration of the second light irradiation.

Third Embodiment

Figure 10:
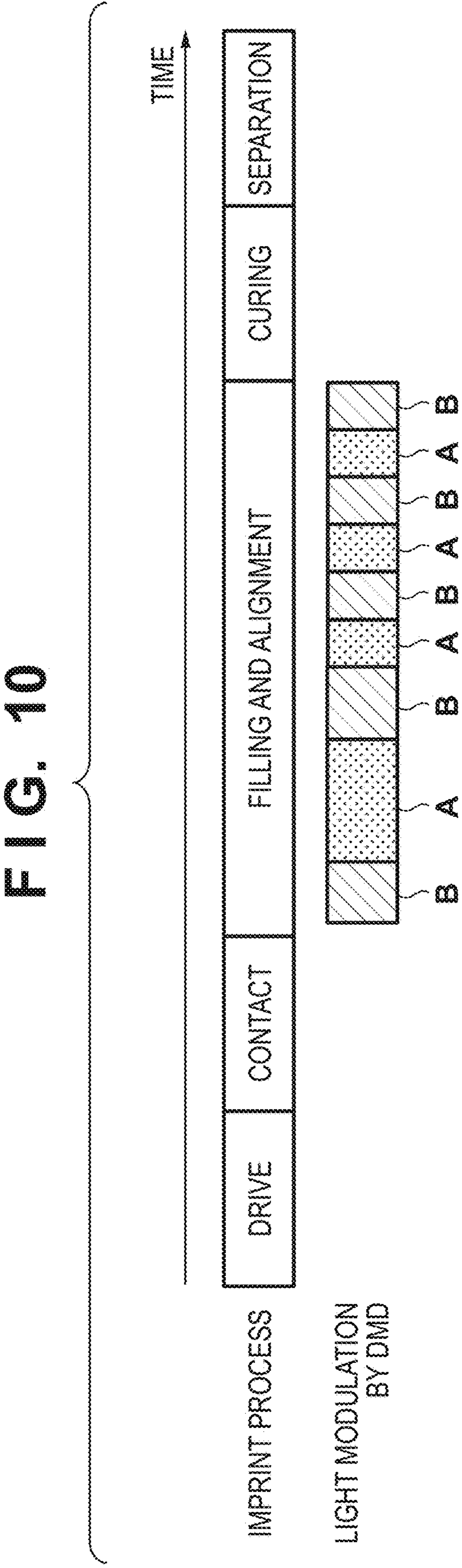
FIG. 10 is a view for explaining an imprint process in an embodiment.

The number of times of repeating switching between a preliminary exposure step A and a heating step B, that is, switching between the first light irradiation and the second light irradiation is not limited to a specific number of times. In the alignment step, a controller 7 can repeatedly perform switching between the preliminary exposure step A and the heating step B a plurality of times. FIG. 10 shows a process diagram in which the preliminary exposure step A and the heating step B are repeated three or more times. As shown in FIG. 10, the heating step B may be executed prior to the preliminary exposure step A. Furthermore, for each switching between the preliminary exposure step A and the heating step B in each time, each of a threshold value Sa (first threshold value) for the viscoelasticity and a threshold value Sb (second threshold value) of the thermal deformation amount may be set to an independent value. For example, for switching from the preliminary exposure step A to the heating step B in each time, threshold values Sa1, Sa2, . . . , SaN can be set, and for switching from the heating step B to the preliminary exposure step A in each time, threshold values Sb1, Sb2, . . . , SbM can be set (each of N and M is an arbitrary natural number). Based on these threshold values, switching between the preliminary exposure step A and the heating step B can be performed.

<Embodiment of Method of Manufacturing Article>

The pattern of a cured product formed using an imprint apparatus is used permanently for at least some of various kinds of articles or temporarily when manufacturing various kinds of articles. The articles are an electric circuit element, an optical element, a MEMS, a recording element, a sensor, a mold, and the like. Examples of the electric circuit element are volatile and nonvolatile semiconductor memories such as a DRAM, a SRAM, a flash memory, and a MRAM and semiconductor elements such as an LSI, a CCD, an image sensor, and an FPGA. Examples of the mold are molds for imprint.

The pattern of the cured product is directly used as at least some of the constituent members of the above-described articles or used temporarily as a resist mask. After etching or ion implantation is performed in the substrate processing step, the resist mask is removed.

Figure 11:
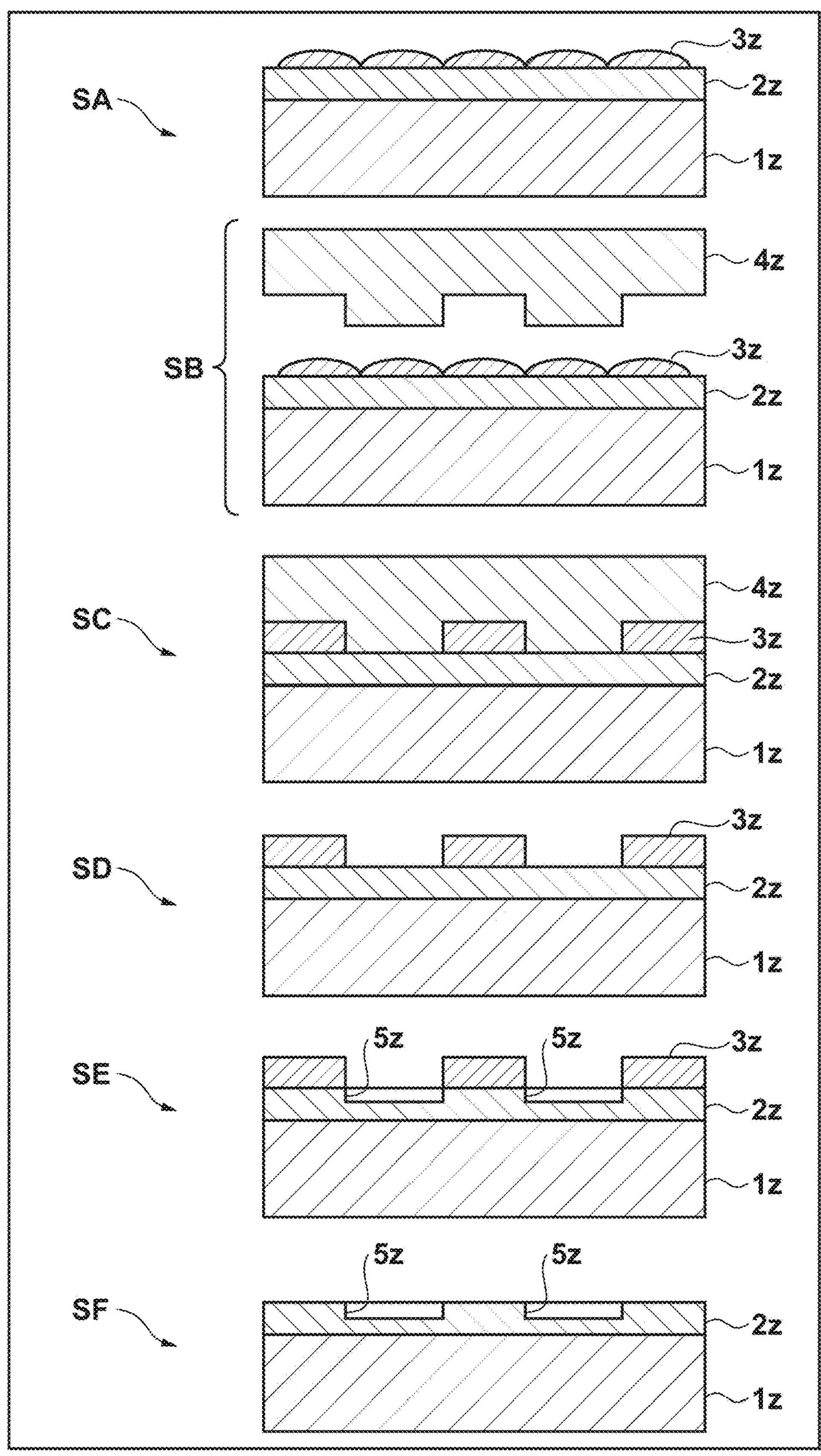
FIG. 11 is a view for explaining an article manufacturing method in an embodiment.

Referring FIG. 11, a method of manufacturing an article will be described. As shown step SA, a substrate 1*z* such as a silicon wafer with a processed material 2*z* such as an insulator formed on the surface is prepared. Next, an imprint material 3*z* is applied to the surface of the processed material 2*z* by an inkjet method or the like. A state in which the imprint material 3*z* is applied as a plurality of droplets onto the substrate is shown here.

As shown in step SB, a side of a mold 4*z* for imprint with an uneven pattern is directed toward and made to face the imprint material 3*z* on the substrate. As shown in step SC, the substrate 1*z* to which the imprint material 3*z* is applied is brought into contact with the mold 4*z*, and a pressure is applied. The gap between the mold 4*z* and the processed material 2*z* is filled with the imprint material 3*z*. In this state, when the imprint material 3*z* is irradiated with energy for curing via the mold 4*z*, the imprint material 3*z* is cured.

As shown in step SD, after the imprint material 3*z* is cured, the mold 4*z* is separated from the substrate 1*z*. Then, the pattern of the cured product of the imprint material 3*z* is formed on the substrate 1*z*. In the pattern of the cured product, the concave portion of the mold corresponds to the convex portion of the cured product, and the convex portion of the mold corresponds to the concave portion of the cured product. That is, the uneven pattern of the mold 4*z* is transferred to the imprint material 3*z*.

As shown in step SE, when etching is performed using the pattern of the cured product as an etching resistant mask, a portion of the surface of the processed material 2*z* where the cured product does not exist or remains thin is removed to form a groove 5*z*. As shown in step SF, when the pattern of the cured product is removed, an article with the grooves 5*z* formed in the surface of the processed material 2*z* can be obtained. Here, the pattern of the cured product is removed. However, instead of processing or removing the pattern of the cured product, it may be used as, for example, an interlayer dielectric film included in a semiconductor element or the like, that is, a constituent member of an article.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-084702, filed May 23, 2023, which is hereby incorporated by reference herein in its entirety.

What is claimed is:

1. An imprint apparatus that performs alignment between a substrate and a mold in a state in which the mold is in contact with an imprint material on the substrate, and then cures the imprint material by light irradiation, the apparatus comprising:

a substrate stage configured to hold the substrate;

a light irradiator configured to perform first light irradiation for partially curing the imprint material, and second light irradiation for deforming the substrate, wherein, in the second light irradiation, the light irradiator irradiates the substrate with light at a wavelength at which the imprint material is not cured, a measurement device configured to measure a vibration amount of a position of one of the substrate and the substrate stage; and a controller configured to control the light irradiator, wherein, in the alignment, the controller is configured to perform switching between the first light irradiation and the second light irradiation based on a viscoelasticity of the imprint material corresponding to the vibration amount.

2. The apparatus according to claim 1, wherein in the alignment, the controller is configured to perform switching from the first light irradiation to the second light irradiation if the viscoelasticity obtained during execution of the first light irradiation exceeds a first threshold value.

3. The apparatus according to claim 2, wherein in the alignment, the controller is configured to further perform switching from the second light irradiation to the first light irradiation if a deformation amount of the substrate obtained during execution of the second light irradiation exceeds a second threshold value.

4. The apparatus according to claim 3, wherein in the alignment, the controller is configured to perform the switching a plurality of times.

5. The apparatus according to claim 4, wherein a value of each of the first threshold value and the second threshold value is set for each switching in each time.

6. The apparatus according to claim 1, further comprising an imaging device configured to capture an image of the imprint material, wherein the controller is configured to calculate the viscoelasticity based on the image of the imprint material obtained by image capturing by the imaging device.

7. The apparatus according to claim 3, further comprising a detector configured to detect a relative position between a mark provided in the substrate and a mark provided in the mold, wherein the controller is configured to calculate the deformation amount based on the relative position detected by the detector.

8. The apparatus according to claim 1, wherein the light irradiator includes a first light source configured to generate first light which partially cures the imprint material, a second light source configured to generate second light which deforms the substrate for the alignment, and a spatial light modulator configured to generate first modulated light obtained by modulating the first light, and second modulated light obtained by modulating the second light.

9. The apparatus according to claim 8, wherein the spatial light modulator includes a digital mirror device.

* * * * *